United States Patent [19]
Lin

[11] Patent Number: 5,975,512
[45] Date of Patent: Nov. 2, 1999

[54] DEVICE FOR TURNING LONG MEMBERS

[76] Inventor: Tsann-Hwang Lin, 44-6, Chiang-Tzy-Ke, Heh-Ping Village, Chu-Chi Hsiang, Chia-Yi Hsien, Taiwan

[21] Appl. No.: 09/148,995

[22] Filed: Sep. 8, 1998

[51] Int. Cl.[6] ........................................... B23Q 1/25
[52] U.S. Cl. .................... 269/76; 269/69; 269/296
[58] Field of Search .................. 269/76, 69, 296, 269/289, 71

[56] References Cited

U.S. PATENT DOCUMENTS

| | | | |
|---|---|---|---|
| 811,448 | 1/1906 | Shellenberger | 269/69 |
| 1,951,869 | 3/1934 | Janiszewski | 269/296 |
| 2,320,079 | 5/1943 | Hartwig | 269/69 |
| 4,206,911 | 6/1980 | Harrison | 269/296 |
| 4,491,307 | 1/1985 | Ellefson | 269/76 |
| 5,904,347 | 5/1999 | Lin | 269/76 |

*Primary Examiner*—David A. Scherbel
*Assistant Examiner*—Daniel G. Shanley
*Attorney, Agent, or Firm*—Larson & Taylor

[57] ABSTRACT

A device for turning long members includes two spaced receiving discs each including a first half disc and a second half disc. Each of the first half discs and the second half discs includes a diametrical side and a semi-circle periphery. The diametrical side of each first half disc having a first cutout defined therein, while the diametrical side of each second half disc having a second cutout defined therein, the first cutout and the second cutout together defining a compartment adapted to be fittingly extended through by a long member. The semi-circle periphery of each of the first half discs and the second discs including a plurality of spaced rectilinear sections. Each first half disc and an associated second half disc include aligned slots when assembled, and further comprises fastening members extended through the aligned slots to secure the first half disc and the associated second half disc together.

6 Claims, 3 Drawing Sheets

DEVICE FOR TURNING LONG MEMBERS

BACKGROUND OF THE INVENTION

1. Field of the Invention

The present invention relates to a device for turning long members for processing without any supporting base.

2. Description of the Related Art

Processing (e.g., soldering) on long, bulky members are difficult as sometimes rotation of the members are required. The members that generally have non-circular outlines are lifted by lifters and then rotated by skilled workers, which is extremely inconvenient. U.S. patent application Ser. No. 08/887,602 filed on Jul. 3, 1997 discloses a device for turning long members, yet bulky bases are still required. The present invention is intended to provide an improved device to solve this problem.

SUMMARY OF THE INVENTION

It is a primary object of the present invention to provide an improved device that may support the long members and turn long members without any base.

A device for turning long members in accordance with the present invention comprises two spaced receiving discs each including a first half disc and a second half disc. Each of the first half discs and the second half discs includes a diametrical side and a semi-circle periphery. The diametrical side of each first half disc having a first cutout defined therein, while the diametrical side of each second half disc having a second cutout defined therein, the first cutout and the second cutout together defining a compartment adapted to be fittingly extended through by a long member. The semi-circle periphery of each of the first half discs and the second discs including a plurality of spaced rectilinear sections. Each first half disc and an associated second half disc include aligned slots when assembled, and further comprises fastening means extended through the aligned slots to secure the first half disc and the associated second half disc together.

A periphery that defines the first cutout includes a notch defined therein for securely holding a nut, and further comprising a bolt extending through the nut to frictionally retain the long member in position. A periphery that defines the second cutout includes a notch defined therein for securely holding a nut, and further comprising a bolt extending through the nut to frictionally retain the long member in position.

The diametrical side of each first disc includes a protrusion defined in each of two ends thereof, and the diametrical side of each first disc includes a recess defined in each of two ends thereof for fittingly receiving an associated said protrusion. Alternatively, the diametrical side of each second disc includes a protrusion defined in each of two ends thereof and the diametrical side of each first disc includes a recess defined in each of two ends thereof for fittingly receiving an associated said protrusion.

Each of the first half discs and the second half discs includes at least one hole defined therein to through which cables may be extended. This also allows the device of the present invention to be lifted.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
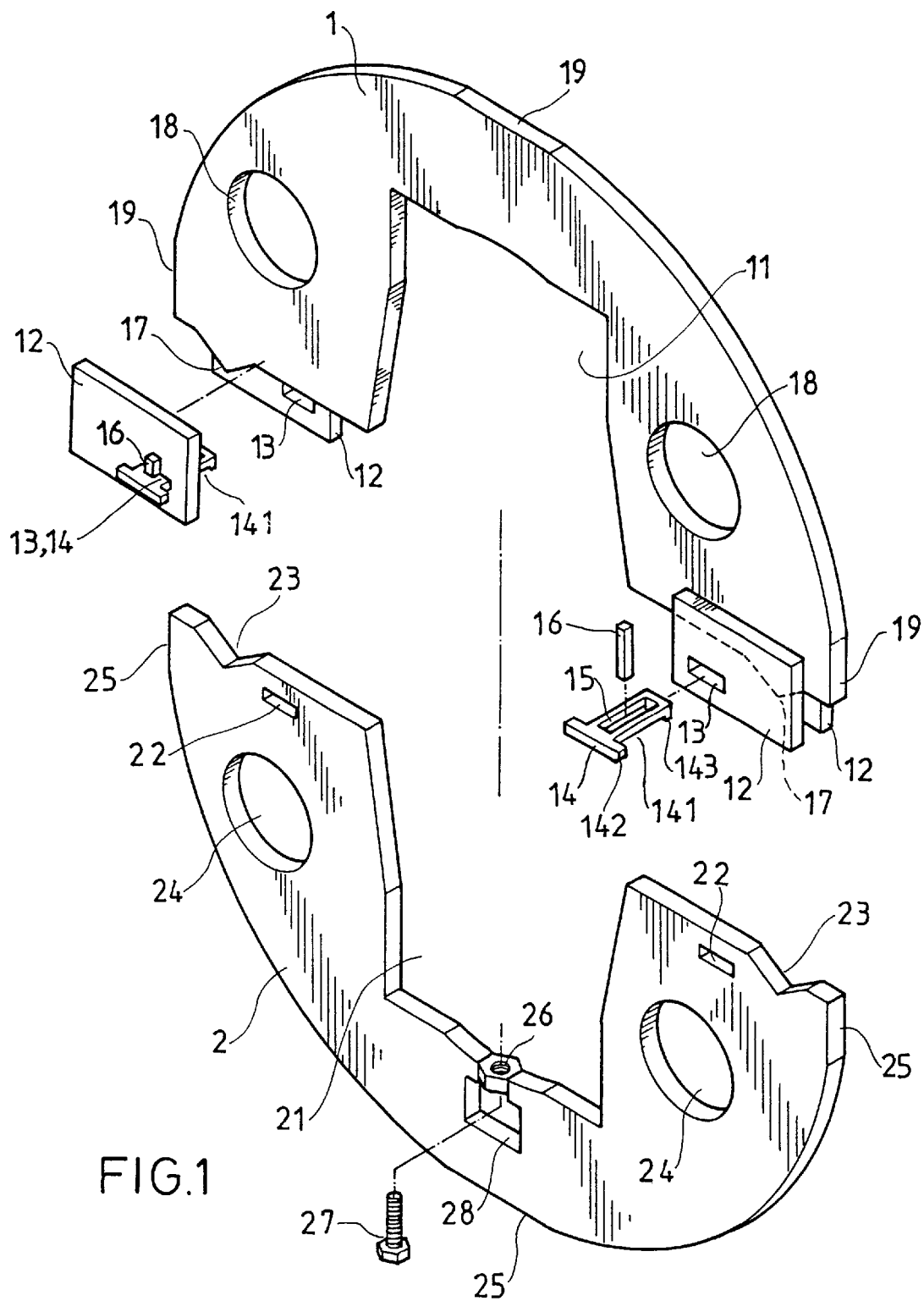
FIG. 1 is an exploded perspective view of a half of a device for turning long members in accordance with the present invention.
Figure 4:
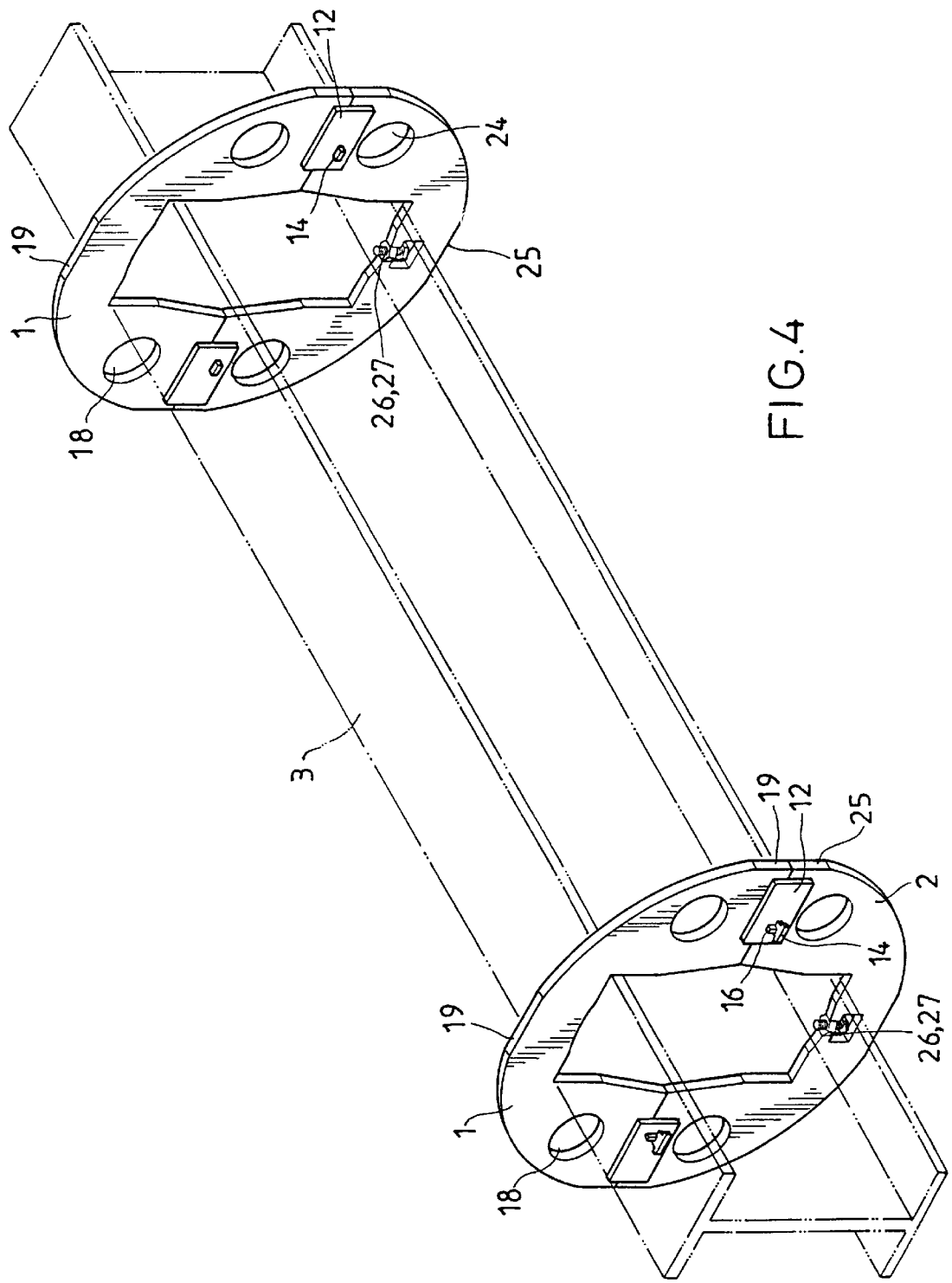
FIG. 4 is a perspective view illustrating use of the device for turning long members.

Referring to FIGS. 1 and 4, a device for turning long members in accordance with the present invention generally includes two spaced receiving discs. Each disc includes a first half disc 1 and a second half disc 2. The first half disc 1 includes a diametrical side (not labeled) that has a cutout 11 defined in a mediate section thereof and a protrusion 17 formed on each of two ends thereof. The first half disc 1 further includes a semi-circle periphery (not labeled) having three rectilinear sections 19 respectively located at two ends thereof and a mediate section thereof. The first half disc 1 further includes holes 18 defined therein. In addition, each end of the diametrical side of the half disc 1 includes two spaced engaging plates 12 attached to two lateral sides thereof, respectively, thereby defining a space therebetween. Each pair of engaging plates 12 include aligned slots 13 defined therein.

Figure 2:
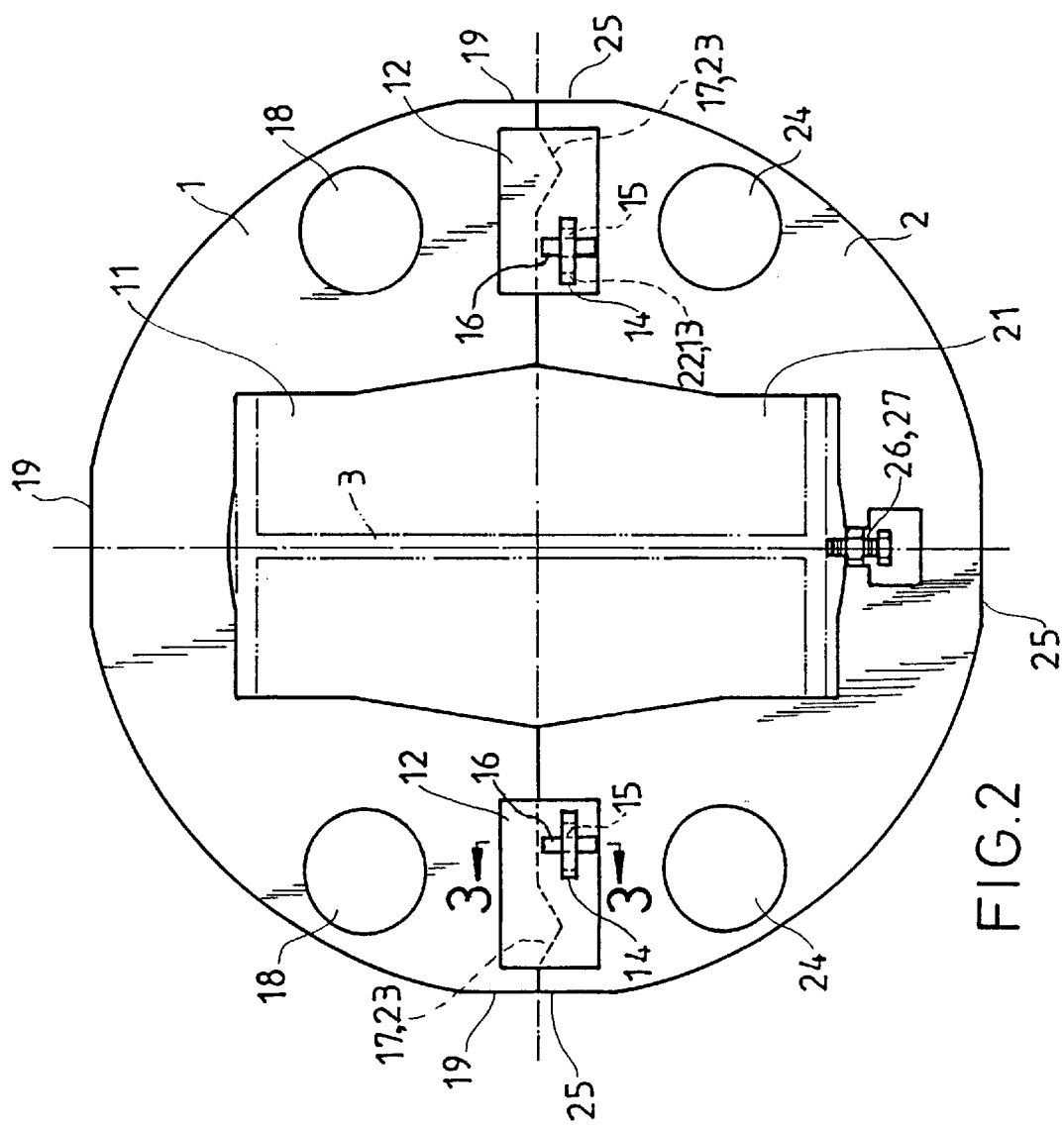
FIG. 2 is a side view of the device for turning long members.

The second half disc 2 includes a diametrical side (not labeled) that has a cutout 21 defined in a mediate section thereof and a recess 23 formed on each of two ends thereof. The cutouts 11 and 21 together define a compartment for receiving long members of a predetermined sectional shape (FIG. 2). The second half disc 2 further includes a semi-circle periphery (not labeled) having three rectilinear sections 25 respectively located at two ends thereof and a mediate section thereof. The second half disc 2 further includes holes 24 defined therein. In addition, two slots 22 are defined in the second half disc 2 and adjacent to the two ends of the diametrical side of the half disc 2, respectively.

In use, referring to FIG. 4, two same half discs (e.g., the second half discs 2) are placed on the ground, in which the rectilinear section 25 in the mediate section of the semi-circle periphery of each half disc 2 touches the ground. After placing the long member 3 into the cutouts 21, the other two same half discs (e.g., the first half discs 1) are assembled to the second half discs 2, respectively by means of engaging the diametrical side of each half disc 1 with an associated half disc 2. In each first half disc 1, the protrusions 17 are fittingly received in the recesses 23 in the second half disc 2, and each slot 22 is aligned with an associated pair of aligned slots 13.

Figure 3:
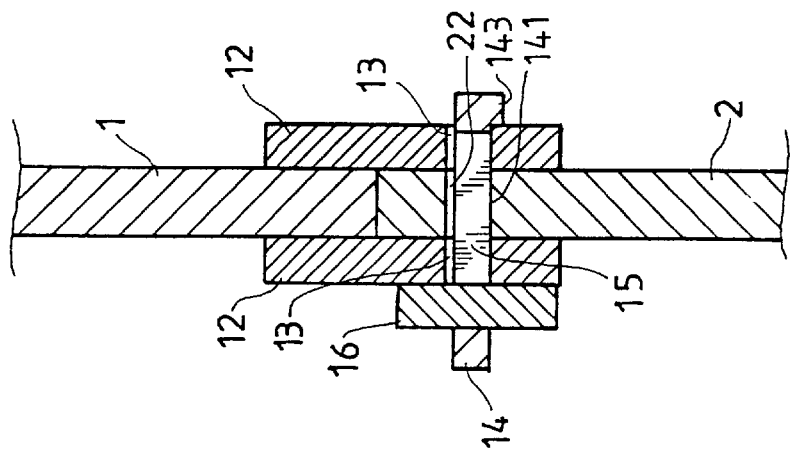
FIG. 3 is a sectional view taken along line 3—3 in FIG. 2.

Two fastening means are provided to engage each half disc 1 with the associated half disc 2. The fastening means includes an engaging member 14 that extends through aligned slots 13 and 22. As shown in FIG. 1, the engaging member 14 includes a longitudinal slot 15 defined in a stem 141 thereof and a positioning member 16 (e.g., a rectangular rod) is extended through the slot 15 to secure the half discs 1 and 2 together. The engaging member 14 may include an enlarged end 142 from which the stem 141 extends. The enlarged end 142 may prevent the engaging member 14 from passing through the slots 13 and 22. In addition, as shown in FIG. 3, the stem 141 of the engaging member 14 may include a holder section 143 that extends downwardly (or upwardly) from a distal end thereof to engage with one of the engaging plates 12, thereby securely holding the discs 1 and 2 together. The positioning member 16 may be soldered to one of the engaging plate 12 to prevent from disengagement of the engaging member 14. In addition, referring to FIGS. 1 and 4, a periphery that defines the cutout 21 of each half disc 2 may include a notch 28 defined therein. A nut 26 may be securely held by a neck section of the notch 28, and a bolt 27 is extended through the nut 26 such that a distal end of the bolt 27 may frictionally engage with the long member 3 to be processed.

The long member 3 can thus be easily rotated by means of rotating the discs that can stably stand on the ground by the rectilinear sections 19 and 25. Alternatively, the discs and the long member 3 can be hanged by cables (not labeled) that pass through the holes 18 and 24 and thus can be easily rotated.

Although the invention has been explained in relation to its preferred embodiment, it is to be understood that many other possible modifications and variations can be made without departing from the spirit and scope of the invention as hereinafter claimed.

What is claimed is:

1. A device for turning long members, comprising:

two spaced receiving discs each including a first half disc and a second half disc, each of the first half discs and the second half discs including a diametrical side and a semi-circle periphery, said diametrical side of each said first half disc having a first cutout defined therein, said diametrical side of each said second half disc having a second cutout defined therein, the first cutout and the second cutout together defining a compartment adapted to be fittingly extended through by a long member, said semi-circle periphery of each of the first half discs and the second discs including a plurality of spaced rectilinear sections, each said first half disc and an associated said second half disc including aligned slots when assembled, and further comprising fastening means extended through the aligned slots to secure the first half disc and the associated second half disc together.

2. The device for turning long members as claimed in claim 1, wherein a periphery that defines the first cutout includes a notch defined therein for securely holding a nut, and further comprising a bolt extending through the nut to frictionally retain the long member in position.

3. The device for turning long members as claimed in claim 1, wherein a periphery that defines the second cutout includes a notch defined therein for securely holding a nut, and further comprising a bolt extending through the nut to frictionally retain the long member in position.

4. The device for turning long members as claimed in claim 1, wherein the diametrical side of each said first disc includes a protrusion defined in each of two ends thereof, and the diametrical side of each said first disc includes a recess defined in each of two ends thereof for fittingly receiving an associated said protrusion.

5. The device for turning long members as claimed in claim 1, wherein the diametrical side of each said second disc includes a protrusion defined in each of two ends thereof and the diametrical side of each said first disc includes a recess defined in each of two ends thereof for fittingly receiving an associated said protrusion.

6. The device for turning long members as claimed in claim 1, wherein each of the first half discs and the second half discs includes at least one hole defined therein.

* * * * *